US011947727B2

(12) United States Patent
Noh et al.

(10) Patent No.: US 11,947,727 B2
(45) Date of Patent: Apr. 2, 2024

(54) MOTION PROCESSING METHOD AND APPARATUS

(71) Applicant: KOREA ADVANCED INSTITUTE OF SCIENCE AND TECHNOLOGY, Daejeon (KR)

(72) Inventors: Junyong Noh, Daejeon (KR); Haegwang Eom, Daejeon (KR); ByungKuk Choi, Daejeon (KR); Kyungmin Cho, Daejeon (KR); Sunjin Jung, Daejeon (KR); Seokpyo Hong, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 416 days.

(21) Appl. No.: 17/242,568

(22) Filed: Apr. 28, 2021

(65) Prior Publication Data
US 2022/0155871 A1 May 19, 2022

(30) Foreign Application Priority Data
Nov. 18, 2020 (KR) .................. 10-2020-0154587

(51) Int. Cl.
*G06F 3/01* (2006.01)
*G06F 3/03* (2006.01)
(Continued)

(52) U.S. Cl.
CPC ............. *G06F 3/017* (2013.01); *G06F 3/011* (2013.01); *G06F 3/03* (2013.01); *G06N 7/01* (2023.01);
(Continued)

(58) Field of Classification Search
CPC . G06F 3/03; G06F 3/011; G06F 3/017; G06F 2218/04; G06F 3/0304;
(Continued)

(56) References Cited

U.S. PATENT DOCUMENTS 11,055,891 B1 * 7/2021 Ofek .................. G06T 13/40
2008/0247465 A1 * 10/2008 Xin .................... H04N 19/56
375/E7.122
(Continued)

FOREIGN PATENT DOCUMENTS

JP 2009514111 A 4/2009
KR 20150065303 A 6/2015
(Continued)

OTHER PUBLICATIONS

Computer Graphics forum "Synthesizing Character Animation with Smoothly Decomposed Motion Layers", Haegwang Eom, et al. pp. 1-13 first published Nov. 29, 2019.
(Continued)

*Primary Examiner* — Congvan Tran
(74) *Attorney, Agent, or Firm* — George R. McGuire

(57) ABSTRACT

A motion processing method and apparatus are provided. The motion processing method includes obtaining a base-level motion by applying a linear Gaussian model to an input motion, obtaining a controllable motion displacement vector and a residual motion displacement vector by applying the linear Gaussian model to a displacement vector between the input motion and the base-level motion, and synthesizing an output motion based on the base-level motion and the controllable motion displacement vector.

19 Claims, 4 Drawing Sheets

(51) Int. Cl.
*G06N 7/01* (2023.01)
*G06V 40/10* (2022.01)
*G06V 40/20* (2022.01)

(52) U.S. Cl.
CPC ............ *G06F 3/0304* (2013.01); *G06V 40/10* (2022.01); *G06V 40/23* (2022.01); *G06V 40/28* (2022.01)

(58) Field of Classification Search
CPC ...... G06F 2218/10; G06N 7/01; G06V 40/23; G06V 40/10; G06V 40/28
See application file for complete search history.

(56) References Cited

U.S. PATENT DOCUMENTS

2010/0111166 A1* 5/2010 Schlanger ............... H04N 19/44
375/E7.125
2022/0306089 A1* 9/2022 Seth ....................... H04W 4/026

FOREIGN PATENT DOCUMENTS

| KR | 101837294 B1 | 3/2018 |
| KR | 20180057676 A | 5/2018 |
| KR | 101896845 B1 | 9/2018 |

OTHER PUBLICATIONS

Synthesizing Character Animation with Smoothly Decomposed Motion Layers, Haegwang Eom, et al. pp. 1-81 Apr. 13, 2021.

\* cited by examiner

MOTION PROCESSING METHOD AND APPARATUS

CROSS-REFERENCE TO RELATED APPLICATION(S)

This application claims the benefit of Korean Patent Application No. 10-2020-0154587, filed on Nov. 18, 2020, in the Korean Intellectual Property Office, the disclosure of which is incorporated herein by reference.

BACKGROUND

1. Field of the Invention

One or more example embodiments relate to a method and apparatus for processing a motion.

2. Description of the Related Art

Techniques of capturing and processing human motion are widely used to generate realistic character animation. However, since human motion is regarded as a type of high-dimensional signals that vary over time, signal processing and geometric techniques may be generalized and applied to various motion synthesis techniques. Since motion synthesis-related techniques such as retargeting, warping, blending, and editing of input motions strongly depend on the quality of the captured input motion data, a process of suitably pre-processing captured input motion data is required for realistic animation synthesis. In particular, there is a demand for the development of a motion decomposition technology to decompose a meaningful primitive motion in an input motion.

SUMMARY

One or more example embodiments provide a technology for extracting a motion primitive that is easily controlled by removing noise from an input motion.

One or more example embodiments provide a motion decomposition technology for generating a smooth motion using a non-parametric generative regression method.

However, technical tasks to be achieved by the present disclosure are not limited to the above-described technical tasks, and other technical tasks may exist.

According to an aspect, there is provided a motion processing method including obtaining a base-level motion by applying a linear Gaussian model to an input motion, obtaining a controllable motion displacement vector and a residual motion displacement vector by applying the linear Gaussian model to a displacement vector between the input motion and the base-level motion, and synthesizing an output motion based on the base-level motion and the controllable motion displacement vector.

The synthesizing of the output motion may include synthesizing the output motion by summing the base-level motion and the controllable motion displacement vector, the output motion including a motion obtained by removing the residual motion displacement vector from the input motion.

The synthesizing of the output motion may include assigning a weight to the controllable motion displacement vector, and synthesizing the output motion by summing the base-level motion and the controllable motion displacement vector with the assigned weight.

The obtaining of the base-level motion may include obtaining a likelihood that is a probability of observation values of the input motion being observed from hidden variables of the base-level motion based on a linear relationship defined between the observation values and the hidden variables, obtaining a prior of the hidden variables based on an assumption associated with a relationship between the hidden variables, and estimating the hidden variables based on the likelihood and the prior.

The estimating of the hidden variables may include calculating a posterior mean for the hidden variables by applying a Bayes' rule to the likelihood and the prior, and estimating the hidden variables based on the posterior mean.

The linear relationship may include first noise following a Gaussian distribution.

The assumption associated with the relationship between the hidden variables may include second noise following a Gaussian distribution.

The obtaining of the base-level motion may include mapping each of observation values of the input motion to each of hidden variables of the base-level motion, defining a linear relationship between the observation values and the hidden variables based on first noise following a Gaussian distribution and a result of the mapping, obtaining a likelihood that is a probability of the observation values being observed from the hidden variables based on the linear relationship, obtaining a prior of the hidden variables based on an assumption associated with a relationship between the hidden variables, and estimating the hidden variables based on the likelihood and the prior.

The observation values of the input motion may include information of poses of a character corresponding to a first number of frames.

The hidden variables of the base-level motion may include information of poses of the character corresponding to a second number of frames.

The mapping of each of the observation values to each of the hidden variables may include mapping each of the observation values to each of the hidden variables at regular intervals based on a ratio between the first number and the second number.

The mapping of each of the observation values to each of the hidden variables may include mapping each of the observation values to each of the hidden variables by dynamically controlling a mapping interval of the observation values and the hidden variables.

The obtaining of the controllable motion displacement vector and the residual motion displacement vector may include obtaining a likelihood that is a probability of observation values of the displacement vector between the input motion and the base-level motion being observed from hidden variables of the controllable motion displacement vector based on a linear relationship defined between the observation values and the hidden variables, obtaining a prior of the hidden variables based on an assumption associated with a relationship between the hidden variables, and estimating the hidden variables based on the likelihood and the prior.

The input motion may include poses of a character corresponding to a first number of frames.

The base-layer motion may include poses of the character corresponding to a second number of frames.

A pose of the character may include a vector related to a translational motion of a root defined corresponding to the character and a rotational motion of joints.

The rotational motion of joints may include a rotational motion defined in a quaternion space.

According to another aspect, there is provided a motion processing apparatus including at least one processor configured to obtain a base-level motion by applying a linear Gaussian model to an input motion, to obtain a controllable motion displacement vector and a residual motion displacement vector by applying the linear Gaussian model to a displacement vector between the input motion and the base-level motion, and to synthesize an output motion based on the base-level motion and the controllable motion displacement vector.

The processor may be configured to synthesize the output motion by summing the base-level motion and the controllable motion displacement vector. The output motion may include a motion obtained by removing the residual motion displacement vector from the input motion.

The processor may be configured to assign a weight to the controllable motion displacement vector, and to synthesize the output motion by summing the base-level motion and the controllable motion displacement vector with the assigned weight.

To obtain the base-level motion, the processor may be configured to map each of observation values of the input motion to each of hidden variables of the base-level motion, to define a linear relationship between the observation values and the hidden variables based on first noise following a Gaussian distribution and a result of the mapping, to obtain a likelihood that is a probability of the observation values being observed from the hidden variables based on the linear relationship, to obtain a prior of the hidden variables based on an assumption associated with a relationship between the hidden variables, and to estimate the hidden variables based on the likelihood and the prior.

The observation values of the input motion may include information of poses of a character corresponding to a first number of frames.

The hidden variables of the base-level motion may include information of poses of the character corresponding to a second number of frames.

The processor may be configured to map each of the observation values of the input motion to each of the hidden variables of the base-level motion at regular intervals based on a ratio between the first number and the second number.

The processor may be configured to map each of the observation values of the input motion to each of the hidden variables of the base-level motion by dynamically controlling a mapping interval of the observation values and the hidden variables.

To obtain the controllable motion displacement vector and the residual motion displacement vector, the processor may be configured to obtain a likelihood that is a probability of observation values of the displacement vector between the input motion and the base-level motion being observed from hidden variables of the controllable motion displacement vector based on a linear relationship defined between the observation values and the hidden variables, to obtain a prior of the hidden variables based on an assumption associated with a relationship between the hidden variables, and to estimate the hidden variables based on the likelihood and the prior.

Additional aspects of example embodiments will be set forth in part in the description which follows and, in part, will be apparent from the description, or may be learned by practice of the disclosure.

According to example embodiments, it is possible to generate a motion to which various motion synthesis technologies, for example, denoising, motion modulation, resampling, and time warping, are applicable.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
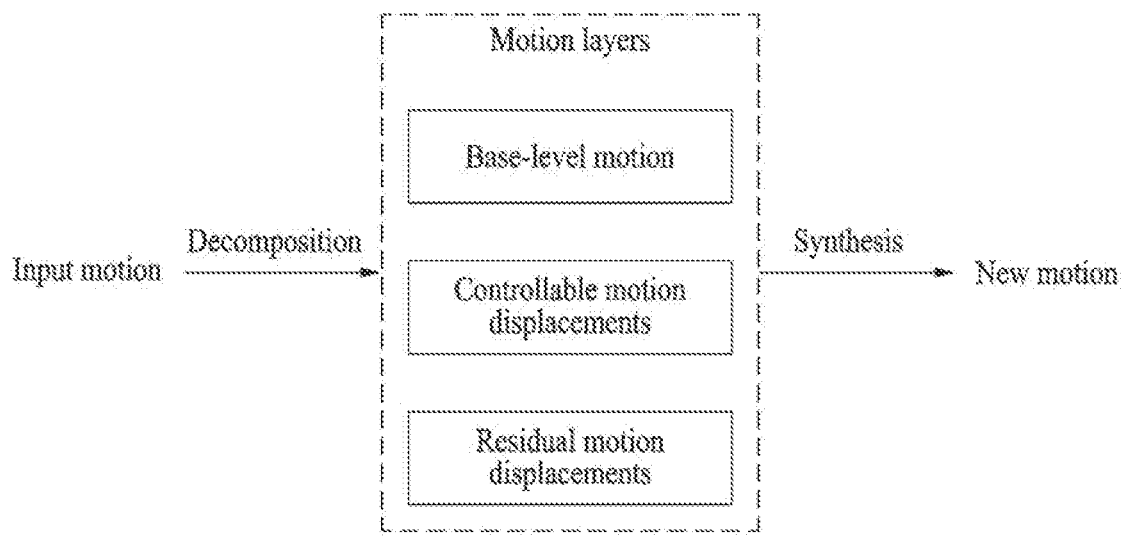
FIG. 1 is a flowchart illustrating a motion processing method according to an example embodiment.

The following structural or functional descriptions of example embodiments described herein are merely intended for the purpose of describing the example embodiments described herein and may be implemented in various forms. However, it should be understood that these example embodiments are not construed as limited to the disclosure and should be understood to include all changes, equivalents, and replacements within the idea and the technical scope of the example embodiments.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. Like reference numerals in the drawings denote like elements, and a known function or configuration will be omitted herein.

In the following description, $\hat{x}$ may be represented as ^x, and $\tilde{x}$ may be represented as ~x.

FIG. 1 is a flowchart illustrating a motion processing method according to an example embodiment.

Referring to FIG. 1, the motion processing method may be a method of synthesizing a new motion from an input motion using a linear Gaussian model. More specifically, the motion processing method may be a motion of decomposing the input motion into three motion layers by applying the linear Gaussian model to the input motion, and of synthesizing a new motion based on the three motion layers. The three motion layers obtained by motion decomposition may include a base-level motion, controllable motion displacements, and residual motion displacements. The residual motion displacements may correspond to high-frequency noise included in the input motion.

According to an example embodiment, a motion may refer to movement information of a specific target (for example, a character) over time, and may include, for example, poses of a character corresponding to a plurality of frames. Here, a pose of a character may include a vector related to a translational motion of a root defined corresponding to the character and a rotational motion of joints.

According to an example embodiment, an operation of decomposing an input motion into three motion layers by applying a linear Gaussian model to the input motion may include an operation of obtaining a base-level motion by applying the linear Gaussian model to the input motion, and an operation of obtaining a controllable motion displacement vector and a residual motion displacement vector by applying the linear Gaussian model to a displacement vector between the input motion and the base-level motion. The displacement vector between the input motion and the base-level motion may correspond to a portion other than the base-level motion in the input motion. The residual motion displacement vector may correspond to a portion obtained by excluding the controllable motion displacement vector from the displacement vector between the input motion and the base-level motion. In other words, the input motion may be decomposed into the base-level motion, the controllable motion displacement vector and the residual motion displacement vector by sequentially applying the linear Gaussian model.

According to an example embodiment, a new motion or an output motion may be synthesized based on the base-level motion and the controllable motion displacement vector obtained by decomposing the input motion. A process of synthesizing a new motion may include a denoising process, a style modulation process, a resampling process, and a time warping process. A process of synthesizing an output motion based on the base-level motion and the controllable motion displacement vector will be described below.

Motion Smoothing Using Linear Gaussian System

According to an example embodiment, a framework of motion decomposition may generate a smooth function from a given motion using a linear Gaussian system (LGS). An LGS may be a non-parametric generative regression technique based on a Bayesian assumption. Thus, when relying on model priors with regard to uncertainty, the LGS may have benefits of naturally avoiding overfitting and underfitting problems that commonly occur when a parametric regression scheme is used.

For a given motion, each joint channel may be assumed to include Nd noisy observations $y=[y1T, y2T, \ldots, yiT, \ldots, yNdT]T$ corresponding to Nf hidden variables $x=[x1T, x2T, \ldots, xjT, \ldots, xNfT]T$. Without a loss of generality, notations x and y may represent all entities describing a degree of freedom of each joint. For example, translation may be represented as x, $y \in R3$, and a hinge joint may be represented as x, $y \in R$. Subsequently, a likelihood $p(y|x)$ may be modeled using the LGS as shown in Equation 1 below.

$$y = Ax + \epsilon_y \quad \text{[Equation 1]}$$

In Equation 1, $\epsilon y \sim N(0, \sigma 2I)$, $\sigma 2$ denotes observation noise, and A denotes an Nd×Nf projection matrix that selects observed data from the entire frame range Nf. For example, when three data points (Nd=3) corresponding to a first frame, a second frame and a fifth frame are given, a projection matrix for estimating xj for five frames (Nf=5) may be constructed as shown in Equation 2 below.

$$A = \begin{bmatrix} 1 & 0 & 0 & 0 & 0 \\ 0 & 1 & 0 & 0 & 0 \\ 0 & 0 & 0 & 0 & 1 \end{bmatrix} \quad \text{[Equation 2]}$$

A number Nd of data points may be fixed to be the same as a number of sampled poses of a given motion. However, a number Nf of target frames to be estimated may be used to control a temporal variation together with the projection matrix A. A scheme of controlling a temporal variation will be described below.

A smoothness prior may be encoded by assuming that xj is a sum of an average of neighbors xj−1 and xj+1 and Gaussian noise, as shown in Equation 3 below.

$$x_j = \tfrac{1}{2}(x_{j-1} + x_{j+1}) + \epsilon_j, (2 \leq j \leq N_j - 1) \quad \text{[Equation 3]}$$

In Equation 3, $\epsilon j \sim N(0, 1/\lambda I)$. Equation 3 may be represented in a vector form as shown in Equation 4 below.

$$Lx = \epsilon \quad \text{[Equation 4]}$$

In Equation 4, L denotes an (Nf−2)×Nf second-order finite difference matrix. A corresponding prior may be represented as shown in Equation 5 below.

$$p(x) = (x|0, (\lambda^2 L^T L)^{-1}) \quad \text{[Equation 3]}$$

Here, a posterior mean or a mean of posterior probabilities may be calculated using a Bayes' rule for the LGS as shown in Equation 6 below.

$$p(x \mid y, \lambda, \sigma) = N(x \mid \mu_{x|y}, \Sigma_{x|y}), \quad \text{[Equation 6]}$$

$$\sum\nolimits_{x|y}^{-1} = \sum\nolimits_{x}^{-1} + A^T \sum\nolimits_{y}^{-1} A = \lambda^2 L^T L + \frac{1}{\sigma^2} A^T A,$$

$$\mu_{x|y} = \sum\nolimits_{x|y} \left[ A^T \sum\nolimits_{y}^{-1} y + \sum\nolimits_{x}^{-1} \mu_x \right]$$

$$= \frac{1}{\sigma^2} \left( \lambda^2 L^T L + \frac{1}{\sigma^2} A^T A \right)^{-1} A^T y.$$

In Equation 6, a posterior mean $\mu$ represents a resulting estimate for a given signal. A prior precision $\lambda$ and a variance of observation noise $\sigma$ may be used as smoothness parameters that have an influence on the posterior mean $\mu$. In particular, for a strong prior (high $\lambda$), an estimated motion may be very smooth, and for a weak prior (low $\lambda$), an estimated motion may be close to a given motion. Although the observation noise $\sigma$ also has an influence on the posterior mean, the prior precision $\lambda$ may contribute more to an overall smoothness. The posterior mean may be calculated by solving an optimization problem of Equation 7 shown below.

$$\min_x \frac{1}{2\sigma^2} \sum_{i=1}^{N_d} (x_{i \to j} - y_i)^2 + \frac{\lambda}{2} \sum_{j=2}^{N_j - 1} \left\{ (x_j - x_{j-1})^2 + (x_j - x_{j+1})^2 \right\} \quad \text{[Equation 6]}$$

In Equation 7, xi→j denotes mapping from an index i of data to a corresponding frame index j, which is similar to a function of the matrix A in Equation 2. This may be recognized as a discrete approximation of a Tikhonov regularization. Here, a first term may fit data and a second term may penalize estimated values that vary extremely widely. In the following description, Equations 6 and 7 may be interchangeably used.

Multi-Level Motion Decomposition

Figure 2:
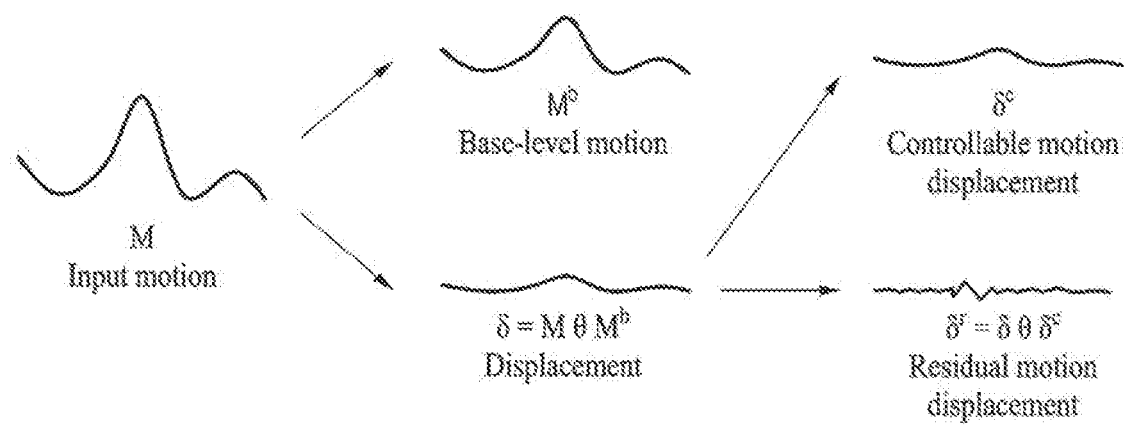
FIG. 2 is a diagram illustrating a motion decomposition process according to an example embodiment.

FIG. 2 is a diagram illustrating a motion decomposition process according to an example embodiment.

In an example embodiment, a motion may be represented as a discretized high-dimensional vector that varies over time. Referring to FIG. 2, $M(t)=(p0(t), q0(t), \ldots, qNj-1(t))$, ($1 \leq t \leq Nf$) denotes a given input motion, and $p0(t) \in R3$ and $qi(t) \in S3$ ($0 \leq i < Nj$) denote a translational motion of a root segment and a rotational motion of an i-th joint at a time t, respectively. Also, Nj denotes a number of joints.

In an example embodiment, an input motion M(t) with a large amount of noise and difficult to manipulate within a high-dimensional vector space of a single layer may be decomposed. A process of decomposing an input motion will be described below.

A base-level motion Mb(t) may be defined as a primitive of the input motion M(t) at a time t. A base-level motion may be obtained by applying the above-described LGS to an input motion. Subsequently, to separate a controllable motion displacement vector δc(t) and a residual motion displacement vector δr(t) with high-frequency noise, the above-described LGS may be applied to a displacement vector δ(t) associated with a difference (residual) between M(t) and Mb(t). In other words, the input motion M(t) may be decomposed into three levels as shown in Equation 8 below.

$$\mathcal{M}(t) = (\mathcal{M}^b(t) \oplus \delta^c(t)) \oplus \delta^r(t) \qquad \text{[Equation 8]}$$

In Equation 8, an operator ⊕ represents a displacement mapping that includes a simple addition of a vector for a translational part and quaternion multiplication for a rotational part after exponentiating a three-dimensional (3D) rotation vector. Quaternion multiplication may be used for a stable composition of a wide range of rotations. In other words, a rotational motion of joints constituting a character may include a rotational motion defined in a quaternion space. Other representations such as an exponential map may generate interpolation artifacts on extreme poses due to singularity thereof.

According to an example embodiment, an operation of obtaining a base-level motion may include an operation of obtaining a likelihood that is a probability of observation values of the input motion being observed from hidden variables of the base-level motion, based on a linear relationship defined between the observation values and the hidden variables, an operation of obtaining a prior of the hidden variables based on an assumption associated with a relationship between the hidden variables, and an operation of estimating the hidden variables based on the obtained likelihood and the obtained prior. Also, the operation of estimating the hidden variables may include an operation of calculating a posterior mean for the hidden variables by applying a Bayes' rule to the obtained likelihood and the obtained prior, and an operation of estimating the hidden variables based on the calculated posterior mean.

In other words, the operation of obtaining the base-level motion may include an operation of obtaining a likelihood p(y|x) based on a linear relationship between x and y according to Equation 1 described above by setting the observation values of the input motion as $y=[y1T, y2T, \ldots, yiT, \ldots, yNdT]T$ and by setting the hidden variables of the base-level motion as $x=[x1T, x2T, \ldots, xjT, \ldots, xNfT]T$, an operation of obtaining a smoothness prior p(x) of Equation 5 based on a relationship between the hidden variables x according to Equation 3, and an operation of estimating the hidden variables x. The operation of estimating the hidden variables x may include an operation of calculating a posterior mean for the hidden variables x according to Equation 6 or 7 described above by applying the Bayes' rule to the obtained likelihood p(y|x) and the obtained prior p(x), and an operation of estimating the calculated posterior mean as x.

To extract a useful base-level motion, a given input motion may be smoothed by optimizing the LGS using a smoothness prior with an assumption of a significant amount of observation noise in the input motion. A strong smoothness prior may be applied by assigning relatively high values to λ and σ in Equation 6. λ and σ may be selected depending on a type of given motions, however, a practical value may be found using a simple heuristic scheme.

In an example of a translational joint, a trajectory in the base-level motion may be extracted by calculating a posterior mean p(Xt|Yt, λb, σb) using Equation 6. Here, Xt and Yt may respectively correspond to an Nf×3 matrix and an Nd×3 matrix created by stacking all translational vectors along rows.

Because orientations and orientations-related operations are generally defined in a quaternion space, a direct approximation of smooth orientations using Equation 6 may lead to an ill-posed estimation problem. Since Equation 6 is specialized for entities in a Euclidean space, a nonlinear optimization problem over the quaternion space for stable estimation of joint orientations may need to be solved by extending Equation 7 as shown in Equation 9 below.

$$\min_{q_x^\theta} \frac{1}{2\sigma^2} \sum_{t=1}^{N_d} \left\| \log(q_x^b(t)^T q_y(t)) \right\|^2 + \\ \frac{\lambda}{2} \sum_{t=2}^{N_f-1} \left\{ \left\| \log(q_x^b(t-1)^T q_x^b(t)) \right\|^2 + \left\| \log(q_x^b(t+1)^T q_x^b(t)) \right\|^2 \right\} \qquad \text{[Equation 9]}$$

In Equation 9, log(q) denotes a quaternion log map that converts a quaternion into a rotation vector. log(qaTqb) denotes a rotational difference between two orientations. However, it may be difficult to differentiate the quaternion log map. Furthermore, optimizing a nonlinear equation may be costly for a large number of frames. Based on observation that for two close orientations qa, $qb \in S3$, a geodesic distance and a chordal distance are approximately equal as shown in Equation 10 below, a cost function of Equation 9 may be simplified as a function for joint orientations without a quaternion log map, as shown in Equation 11.

$$g(q_a, q_b) = \left\| \log(q_a^T q_b) \right\| \approx \| q_b - q_a \| \qquad \text{[Equation 10]}$$

$$\min_{q_x^b} \frac{1}{2\sigma^2} \sum_{t=1}^{N_d} \left\| q_x^b(t) - q_y(t) \right\|^2 + \\ \frac{\lambda}{2} \sum_{t=2}^{N_f-1} \left\{ \left\| q_x^b(t) - q_x^b(t-1) \right\|^2 + \left\| q_x^b(t) - q_x^b(t+1) \right\|^2 \right\} \qquad \text{[Equation 11]}$$

Equation 11 may be suitable for setting of the LGS, and accordingly solving Equation 11 may be identical to calculating the posterior mean $p(Xt|Yt, \lambda b, \sigma b)$ using Equation 6. Here, Xq and Yq denote an Nf×4 matrix and an Nd×4 matrix created by stacking all quaternions q as a four-dimensional (4D) homogeneous vector along rows, respectively. A posterior mean of orientations may need to be renormalized to ensure that quaternions retain a unit length.

As described above, a prior precision $\lambda$ and a variance of observation noise $\sigma$ in Equation 11 may be essential parameters related to smoothness of a base-level motion. In an example, if the base-level motion is extracted by applying a weak prior (low $\lambda$ and $\sigma$), a controllable motion displacement vector may be eventually generated as a vector that has a small difference from the base-level motion and that is incapable of providing sufficient controllability. In another example, if the base-level motion is extracted with a strong prior (high $\lambda$ and $\sigma$), a rotation vector of the controllable motion displacement vector may be incorrectly defined. Thus, proper parameter values for $\lambda$ and $\sigma$ may need to be found.

When the base-level motion is obtained, a motion displacement vector $\delta(t)$ between an input motion and the base-level motion may be calculated as shown in Equation 12 below, specifically as Equation 13 below.

$$\delta(t) = M(t) \ominus M^b(t) \quad \text{[Equation 12]}$$

$$\delta(t) = \begin{pmatrix} p_0(t) \\ q_0(t) \\ \vdots \\ q_{N_j-1}(t) \end{pmatrix} \ominus \begin{pmatrix} p_0^b(t) \\ q_0^b(t) \\ \vdots \\ q_{N_j-1}^b(t) \end{pmatrix} \quad \text{[Equation 13]}$$

$$= \begin{pmatrix} p_0(t) - p_0^b(t) \\ \log(q_0^b(t)^T q_0(t)) \\ \vdots \\ \log(q_{N_j-1}^b(t)^T q_{N_j-1}(t)) \end{pmatrix}$$

$$= \begin{pmatrix} u_0(t) \\ v_0(t) \\ \vdots \\ v_{N_j-1}(t) \end{pmatrix}$$

In Equation 13, $u0(t) \in R3$ denotes a translational vector for a root, and $vi(t)=\theta \hat{v}i(t) \in R3$ denotes a rotation vector that maps $vi(t)$ to a unit quaternion representing a rotation of $\theta=\|vi(t)\|$ about an axis $\hat{v}i(t)=vi(t)/\|vi(t)\|$ by a quaternion exponentiation $\exp(vi(t))$. An operator $\ominus$ may correspond to an inverse of the displacement mapping described above with reference to Equation 8.

In general, quaternion exponentiation is a many-to-one mapping. Thus, a domain may be limited to $\|vi(t)\|<\pi$ to define an inverse log map in Equation 13. Therefore, in decomposition setting for the base-level motion, $qib(t)$ may need to be designed to include a sufficient range $\|\log(q_i^b(t))\| \leq \pi$ of a given orientation by smoothing the original orientation $qi(t)$. As a result, an exponential map $vi(t)$ may guarantee a one-to-one mapping and its inverse log map may be defined within the limited domain $\|vi(t)\|<\pi$.

A simple heuristic scheme may be used to find an optimal parameter value for the above-described smoothness prior, which may lead to a reasonable and practical base-level motion. Equation 11 may be iteratively applied to a given motion while increasing both $\lambda$ and $\sigma$ until an inverse log map of a motion displacement according to Equation 13 becomes greater than a predetermined threshold, starting from a weak prior value ($\lambda=1.0$ and $\sigma=0.1$), and the above iteration may be stopped based on a condition of Equation 14 shown below.

$$\max\|v_i(t)\| < \gamma \quad \text{[Equation 14]}$$

Because of varying degrees of movement of a given motion, a portion of motions may require greater maximum displacements than other motions. Instead of manually setting $\lambda$ and $\sigma$ for each case, a user may easily extract a base-level motion from various motions according to an intuitive criterion $\gamma(\pi/2 \leq \gamma < \pi)$, which determines a control range.

According to an example embodiment, an operation of obtaining a controllable motion displacement vector and a residual motion displacement vector may include an operation of obtaining a likelihood that is a probability of observation values of a displacement vector between the input motion and the base-level motion being observed from hidden variables of the controllable motion displacement vector based on a linear relationship defined between the observation values and the hidden variables, an operation of obtaining a prior of the hidden variables based on an assumption associated with a relationship between the hidden variables, and an operation of estimating the hidden variables based on the obtained likelihood and the obtained prior.

In other words, an operation of obtaining a controllable motion displacement vector $\delta c(t)$ and a residual motion displacement vector $\delta r(t)$ may include an operation of obtaining a likelihood $p(y|x)$ that is based on a linear relationship between x and y according to Equation 1 described above by setting observation values of a displacement vector $\delta(t)$ between the input motion and the base-level motion as $y=[y1T, y2T, \ldots, yiT, \ldots, yNdT]T$ and by setting hidden variables of the controllable motion displacement vector $\delta c(t)$ as $x=[x1T, x2T, \ldots, xjT, \ldots, xNfT]T$, an operation of obtaining a smoothness prior $p(x)$ of Equation 5 based on a relationship between the hidden variables x according to Equation 3, and an operation of estimating the hidden variables x. Here, A according to Equation 3 may correspond to an identity matrix. The operation of estimating the hidden variables x may include an operation of calculating a posterior mean for the hidden variables x according to Equation 6 or 7 described above by applying the Bayes' rule to the obtained likelihood $p(y|x)$ and the obtained prior $p(x)$, and an operation of estimating the calculated posterior mean as x.

According to an example embodiment, a parameter of the linear Gaussian model applied to obtain the base-level motion, and a parameter of the linear Gaussian model applied to obtain the controllable motion displacement vector may be set to differ from each other. For example, values of $\lambda$ and $\sigma$ of the linear Gaussian model applied to obtain the base-level motion may be set to differ from values of $\lambda$ and $\sigma$ of the linear Gaussian model applied to obtain the controllable motion displacement vector.

Because the base-level motion $Mb(t)$ is extracted as smoothly as possible while reasonably approximating a given motion, the displacement vector $\delta(t)$ obtained by decomposing the input motion may contain high-frequency noise of the original input motion. To remove high-frequency noise from the input motion, the LGS may be applied again and high-frequency residual noise may be separated from the displacement vector $\delta(t)$ as shown in Equation 15 below.

$$\delta^c(t) = \mu_{X\delta|Y\delta, \lambda^c, \sigma^c}(t),$$

$$\delta^r(t) = \widetilde{\exp}(\delta(t)) \ominus \widetilde{\exp}(\delta^c(t)) \quad \text{[Equation 15]}$$

In Equation 15, ~exp(δ)=(u0(t), exp(v0(t), ..., exp(vNj−1(t))) denotes an exponential map generalized to displacement vectors, and a smoothed displacement vector δc(t) may be a posterior mean of p(Xδ|Yδ, λc, σc) at a time t. Since δr(t) corresponds to high-frequency residual noise of the original motion, it may be desirable to remove δr(t).

From a geometric point of view, δc(t) may be interpreted as a translational motion u0(t) of a root and rotations $\{vi(t)|0 \leq I < Nj\}$ of all joints of a base-level motion Mb(t)= (p0b(t), q0b(t), ..., qNj−1b(t)). Also, since a scalar multiplication of a rotation vector $\alpha v \in R3$ is accurately defined, a spinning motion around the same axis ^v may be represented, but a magnitude of a rotation angle ‖v‖ may be scaled by a factor of α, and δc(t) may be used to control a synthesized motion as shown in Equation 16 below.

$$M'(t) = M^b(t) \oplus W(t)\delta^c(t) \quad \text{[Equation 16]}$$

In Equation 16, M'(t) denotes the synthesized motion, and W(t) denotes a block diagonal matrix that controls a scale of a displacement vector for each joint at a time t as shown in Equation 17 below.

$$W = \begin{bmatrix} \alpha_0^u I_3 & 0 & \cdots & 0 \\ 0 & \alpha_0^v I_3 & & \vdots \\ \vdots & & \ddots & 0 \\ 0 & \cdots & 0 & \alpha_{N_j-1}^v I_3 \end{bmatrix} \quad \text{[Equation 17]}$$

In Equation 17, α0uI3 and αivI3 denote a weight factor for translation of a root and a weight factor for rotation of an i-th joint, respectively. A scheme of designing a control matrix W(t) for denoising and style modulation will be described below.

Since a joint space signal is used in a decomposition technology according to an example embodiment, a resulting joint trajectory in an operation space, that is, a joint path in the world space may deviate from the original trajectory after a new motion is synthesized. In an example of a closed-chain joint, such as a leg that has rich foot contacts, undesirable artifacts such as foot sliding may occur. To avoid such artifacts, all environmental contacts of the original motion may be pre-calculated, and a spacetime optimization problem may be solved to synthesize a motion with a set of contact constraints. A final motion for environmental contacts may be calculated as shown in Equation 18 below.

$$M^*(t) = M'(t) \oplus \delta^e(t) = (M^b(t) \oplus W(t)\delta^c(t)) \oplus \delta^e(t) \quad \text{[Equation 18]}$$

In Equation 18, M'(t) denotes a synthesized motion using Equation 16 without consideration for a contact, and δe(t) denotes a displacement vector at a time t calculated by spacetime optimization given the original contact points as position constraints.

Figure 3:
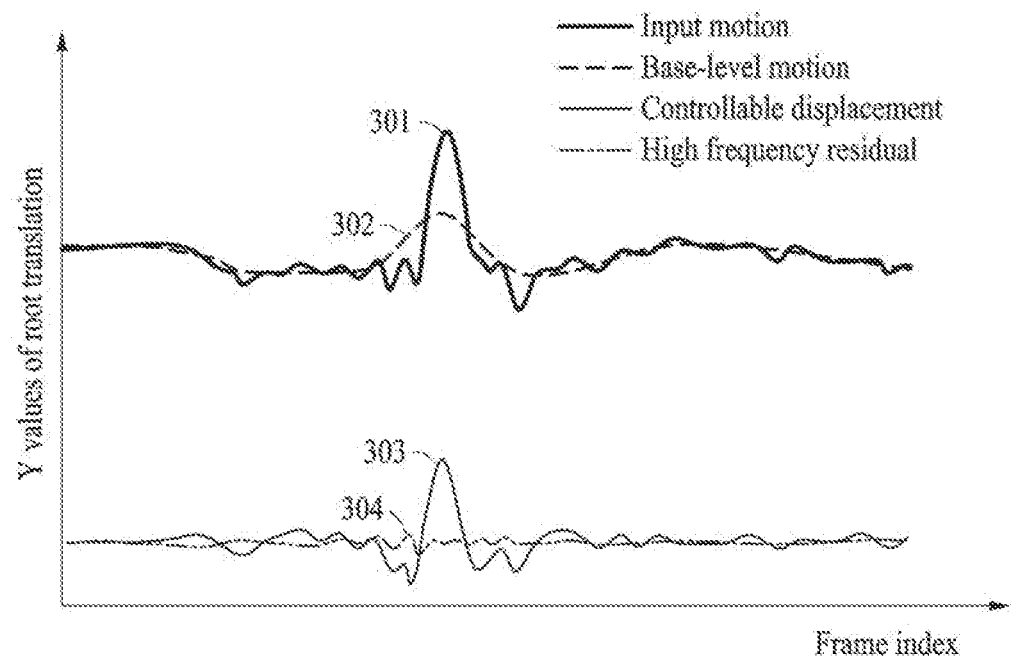
FIG. 3 is a graph illustrating a result of decomposition of an input motion according to an example embodiment.

FIG. 3 is a graph illustrating a result of decomposition of an input motion according to an example embodiment. As described above, the input motion may be decomposed into a base-level motion, a controllable motion displacement vector, and a residual motion displacement vector by sequentially applying a linear Gaussian model. FIG. 3 shows position changes of y values of a root due to a translational motion of a character in a space in which the character is defined. The graph of FIG. 3 shows a position change 301 of a y value included in the input motion, a position change 302 of a y value included in the base-level motion, a position change 303 of a y value included in the controllable motion displacement vector, and a position change 304 of a y value included in the residual motion displacement vector. Referring to FIG. 3, it may be found that the residual motion displacement vector obtained by separating the base-level motion and the controllable motion displacement vector from the input motion corresponds to high-frequency noise.

Figure 4:
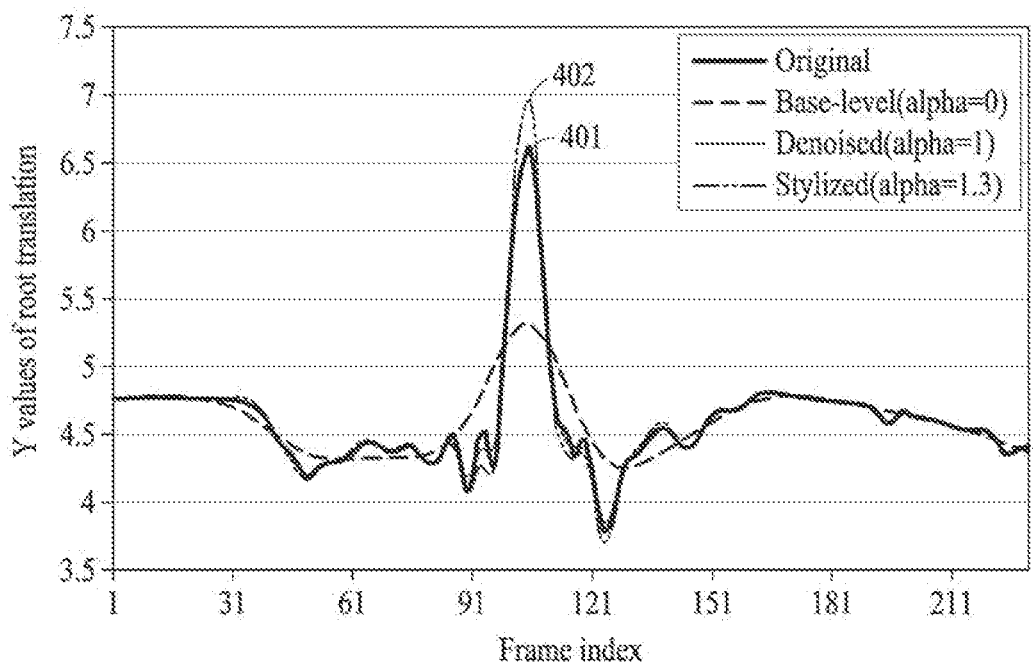
FIG. 4 is a graph illustrating denoising and style modulation according to an example embodiment.

FIG. 4 is a graph illustrating denoising and style modulation according to an example embodiment.

An output motion M'(t) according to an example embodiment may be synthesized based on a base-level motion Mb(t) and a controllable motion displacement vector δc(t) as shown in Equation 19 below.

$$M'(t) = M^b(t) \oplus \alpha \delta^c(t) \quad \text{[Equation 19]}$$

Referring to FIG. 4, a denoised output motion 401 and a stylized output motion 402 may be synthesized based on a value of α, and a degree of denoising and a degree of style modulation may be adjusted by adjusting the value of α. For example, if the value of α is close to "0", an output motion close to a base-level motion may be synthesized, and if the value of α is "1", a denoised output motion may be synthesized. As a value of α increases, a degree of modulation in the original motion for an output motion to be synthesized may increase.

Denoising

A process of synthesizing an output motion according to an example embodiment may include a denoising process. An operation of synthesizing an output motion for denoising may include an operation of synthesizing an output motion by summing the base-level motion and the controllable motion displacement vector, and the output motion may include a motion obtained by removing the residual motion displacement vector from the input motion.

Removing noise from a captured motion may be a pre-processing task that needs to be performed to obtain a high-quality motion. According to an example embodiment, high-frequency noise δr(t) may be automatically removed from the input motion during a decomposition process. For example, a denoised motion may be obtained by setting W(t)=I in Equation 16 or setting α=1 in Equation 19. Referring to FIG. 4, all instances of high-frequency noise in a joint space may be effectively removed so that a signal in an operation space of joints may be naturally denoised. A smooth signal in a space may be particularly important when spacetime constraints need to be imposed for further processing of a resulting motion.

Style Modulation

A process of synthesizing an output motion according to an example embodiment may include a style modulation process. An operation of synthesizing an output motion for style modulation may include an operation of assigning a weight to a controllable motion displacement vector and an operation of synthesizing the output motion by summing the base-level motion and the controllable motion displacement vector with the assigned weight.

In an example, the controllable motion displacement vector may be modulated with respect to the base-level motion by continuously changing a value of α, instead of setting α=1 in Equation 19 described above. A control matrix W(t) that separately has an influence on a set of joints may be designed to achieve a more useful extension. In another example, a motion may be modulated by controlling a partial set of joints αiv of a selected body part, instead of using a uniform value of a for all joints in Equation 17 described above.

FIGS. 5 to 8 are graphs illustrating resampling and time warping according to an example embodiment.

As described above, a motion may include poses of a character corresponding to a plurality of frames, and a number Nd of frames of a given motion and a number Nf of frames of a target motion to be estimated may be determined to differ from each other in a linear Gaussian model.

Figure 5:
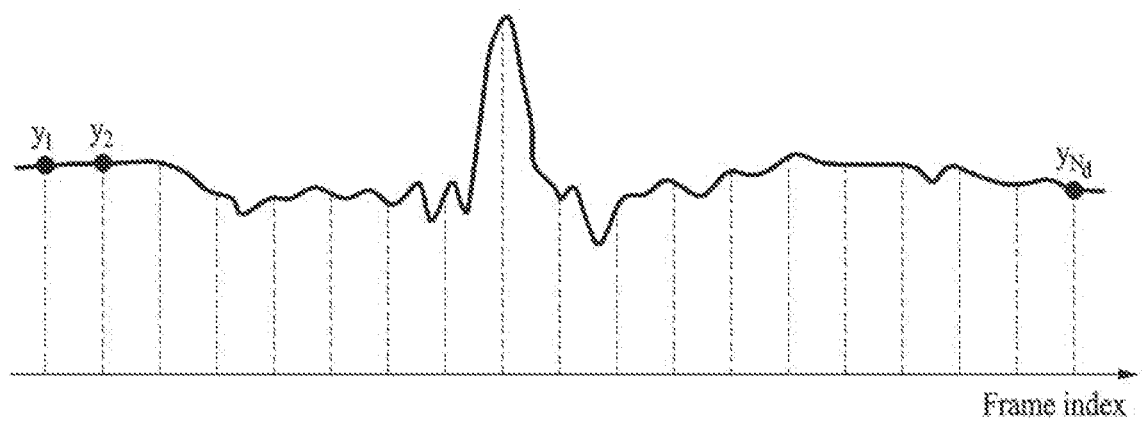
FIGS. 5 to 8 are graphs illustrating resampling and time warping according to an example embodiment.
Figure 6:
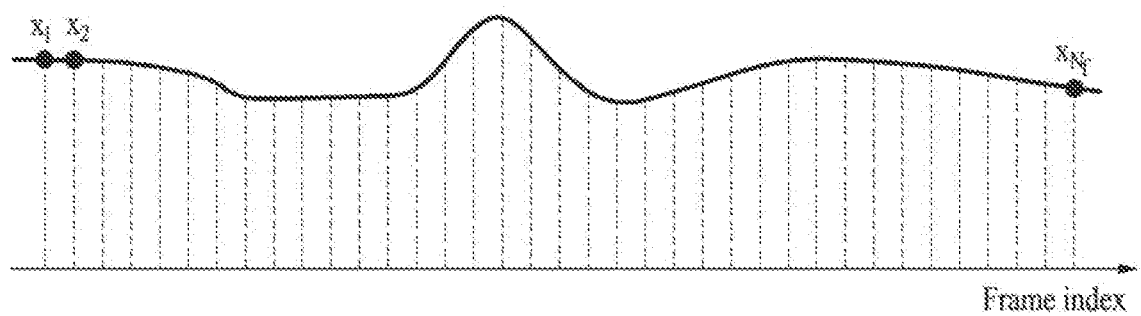

For example, referring to FIG. 5, an observation value y corresponding to each of Nd frames of the given motion may include information of Nd poses of a character, and may be, for example, y1, y2, and yNd. Referring to FIG. 6, a latent value x corresponding to each of Nf frames of the target motion to be estimated may include information of Nf poses of a character, and may be, for example, x1, x2, and xNf. The number Nf of frames of the target motion may be greater than the number Nd of frames of the given motion as shown in FIGS. 5 and 6, or may be equal to or less than the number Nd of frames of the given motion.

For example, when the linear Gaussian model is applied to an input motion to obtain a base-level motion, observation values of the input motion may include information of poses of a character corresponding to a first number of frames, and hidden variables of the base-level motion may include information of poses of the character corresponding to a second number of frames. In this example, an operation of defining a linear relationship between the observation values of the input motion and the hidden variables of the base-level motion according to Equation 1 may include an operation of mapping each of the observation values to each of the hidden variables and an operation of defining the linear relationship between the observation values and the hidden variables based on noise $\epsilon y$ following a Gaussian distribution and a mapping result.

According to an example embodiment, the operation of mapping each of the observation values to each of the hidden variables may correspond to an operation of designing the above-described projection matrix A. As described above, a number Nf of target frames to be estimated and the projection matrix A may be used to control a temporal variation, for example, resampling and time warping. In other words, to synthesize a temporal variation prior to a decomposition process, the number Nf of target frames to be estimated may be changed in Equation 7 described above, and mapping from an observation value yi in a frame i of a given motion to a hidden variable xj in a frame j of a target motion to be estimated may be performed.

Resampling

For example, as shown in FIG. 6, when uniform mapping from yi to xj is performed, a resampled motion may be obtained. The uniform mapping may refer to mapping each of the observation values of the input motion to each of the hidden variables of the base-level motion at regular intervals based on a ratio between Nd and Nf. For example, if Nf is twice Nd, yi may be mapped to x2xi at an interval of two frames based on the ratio between Nd and Nf (i=0, 1, 2, ..., Nd−1). If Nf is three times Nd, yi may be mapped to x3xi at an interval of three frames based on the ratio between Nd and Nf (i=0, 1, 2, ..., Nd−1). Even in a case of upsampling, stable in-between rotations may be generated based on neighboring rotations by a smoothness prior.

Time Warping

Figure 7:
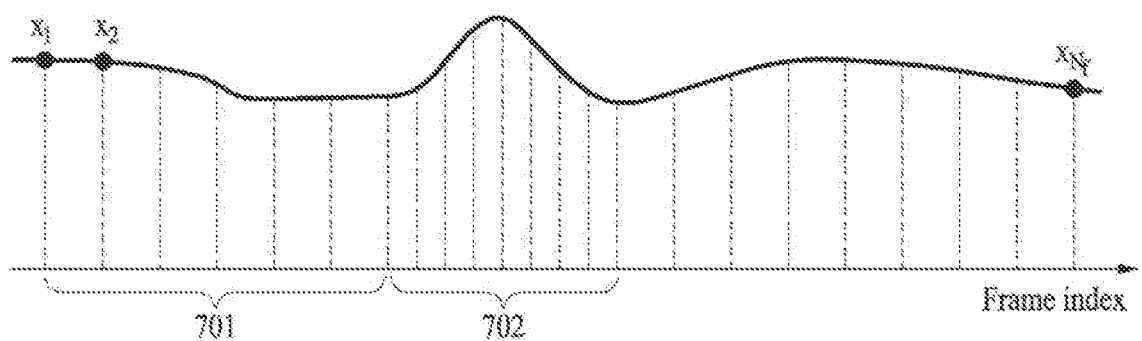
Figure 8:
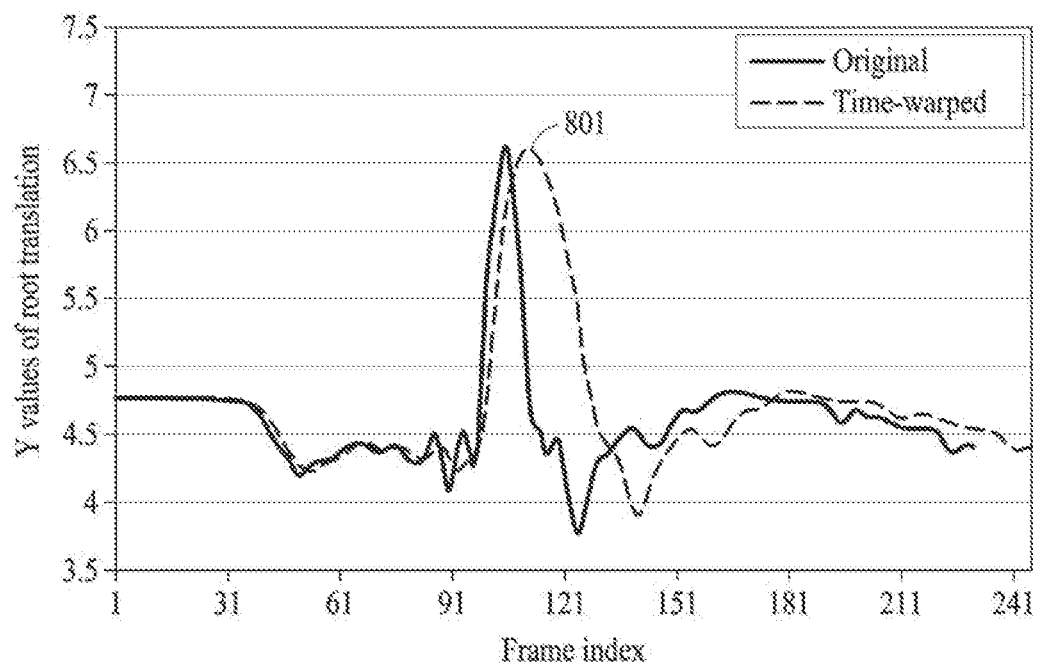

A time-warped motion may be synthesized by dynamically changing a mapping interval over time, instead of uniformly mapping yi and xj at regular intervals. In other words, each of the observation values of the input motion may be mapped to each of the hidden variables of the base-level motion at irregular intervals, and thus a time-warped output motion may be synthesized. For example, as shown in FIG. 7, a mapping interval of a section 701 may be different from a mapping interval of a section 702. Through time warping of dynamically changing a mapping interval between yi and xj based on a displacement between adjacent frames, an output motion in which a portion of the input motion is emphasized may be synthesized. Referring to FIG. 8, a mapping interval between yi and xj may be changed based on a displacement between adjacent frames, and thus a time-warped output image 801 may be synthesized in a portion of sections.

Figure 9:
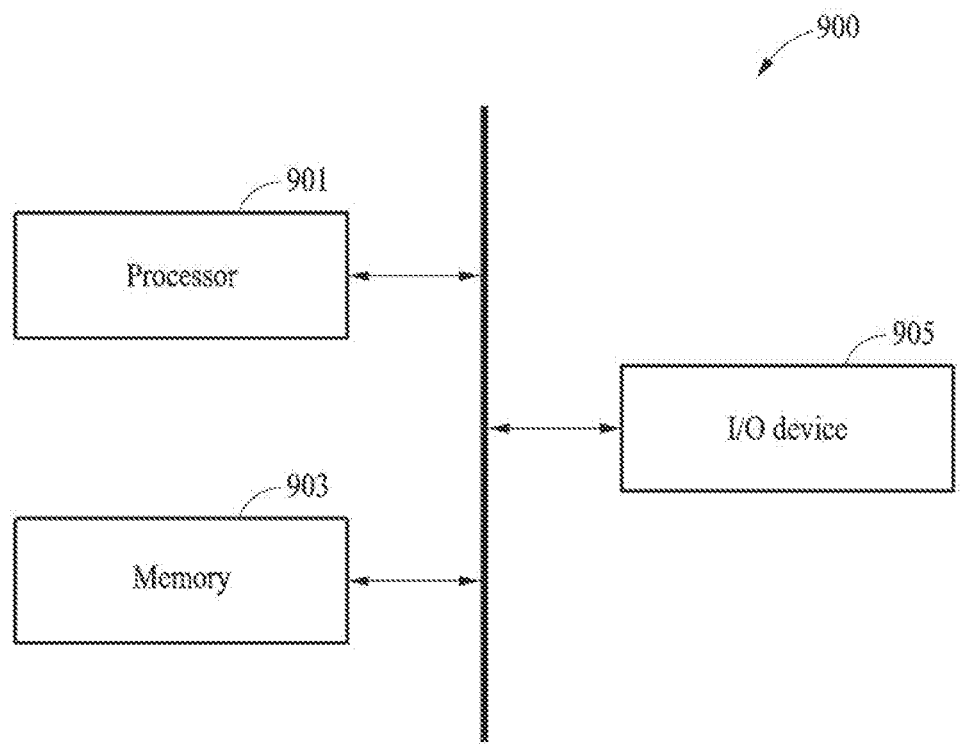
FIG. 9 illustrates an example of a configuration of an apparatus according to an example embodiment.

FIG. 9 illustrates an example of a configuration of an apparatus 900 according to an example embodiment.

Referring to FIG. 9, the apparatus 900 includes a processor 901, a memory 903, and an input and/or output (I/O) device 905.

The apparatus 900 may be an apparatus for performing the above-described motion processing method, and may include, for example, a server, and a device (for example, a mobile phone, or a computer) of a user. The processor 901 may perform operations of at least one of the methods described above with reference to FIGS. 1 to 8. The memory 903 may store information associated with the above-described motion processing method, or a program in which the above-described motion processing method is implemented. The memory 903 may include, for example, a volatile memory, or a non-volatile memory.

The processor 901 may execute a program and control the apparatus 900. Code of a program executed by the processor 901 may be stored in the memory 903. The apparatus 900 may be connected to an external device (for example, a personal computer, or a network) via the I/O device 905 and may exchange data.

The example embodiments described herein may be implemented using hardware components, software components, and/or a combination thereof. For example, the methods, apparatuses, and other components described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A motion processing method comprising:
    obtaining a base-level motion by applying a linear Gaussian model to an input motion;
    obtaining a controllable motion displacement vector and a residual motion displacement vector by applying the linear Gaussian model to a displacement vector between the input motion and the base-level motion; and
    synthesizing an output motion based on the base-level motion and the controllable motion displacement vector, wherein the input motion comprises poses of a character corresponding to a first number of frames, the base-layer motion comprises poses of the character corresponding to a second number of frames, and a pose of the character comprises a vector related to a translational motion of a root defined corresponding to the character and a rotational motion of joints.

2. The method of claim 1, wherein the synthesizing of the output motion comprises synthesizing the output motion by summing the base-level motion and the controllable motion displacement vector, the output motion comprising a motion obtained by removing the residual motion displacement vector from the input motion.

3. The method of claim 1, wherein the synthesizing of the output motion comprises:
    assigning a weight to the controllable motion displacement vector; and
    synthesizing the output motion by summing the base-level motion and the controllable motion displacement vector with the assigned weight.

4. The method of claim 1, wherein the obtaining of the base-level motion comprises:
    obtaining a likelihood that is a probability of observation values of the input motion being observed from hidden variables of the base-level motion based on a linear relationship defined between the observation values and the hidden variables;
    obtaining a prior of the hidden variables based on an assumption associated with a relationship between the hidden variables; and
    estimating the hidden variables based on the likelihood and the prior.

5. The method of claim 4, wherein the estimating of the hidden variables comprises:
    calculating a posterior mean for the hidden variables by applying a Bayes' rule to the likelihood and the prior; and
    estimating the hidden variables based on the posterior mean.

6. The method of claim 4, wherein the linear relationship comprises first noise following a Gaussian distribution, and the assumption associated with the relationship between the hidden variables comprises second noise following a Gaussian distribution.

7. The method of claim 1, wherein the obtaining of the base-level motion comprises:
    mapping each of observation values of the input motion to each of hidden variables of the base-level motion;
    defining a linear relationship between the observation values and the hidden variables based on first noise following a Gaussian distribution and a result of the mapping;
    obtaining a likelihood that is a probability of the observation values being observed from the hidden variables based on the linear relationship;
    obtaining a prior of the hidden variables based on an assumption associated with a relationship between the hidden variables; and
    estimating the hidden variables based on the likelihood and the prior,
    the observation values comprise information of poses of a character corresponding to a first number of frames, and
    the hidden variables comprise information of poses of the character corresponding to a second number of frames.

8. The method of claim 7, wherein the mapping of each of the observation values to each of the hidden variables comprises mapping each of the observation values to each of the hidden variables at regular intervals based on a ratio between the first number and the second number.

9. The method of claim 7, wherein the mapping of each of the observation values to each of the hidden variables comprises mapping each of the observation values to each of the hidden variables by dynamically controlling a mapping interval of the observation values and the hidden variables.

10. The method of claim 1, wherein the obtaining of the controllable motion displacement vector and the residual motion displacement vector comprises:
    obtaining a likelihood that is a probability of observation values of the displacement vector between the input motion and the base-level motion being observed from hidden variables of the controllable motion displacement vector based on a linear relationship defined between the observation values and the hidden variables;

obtaining a prior of the hidden variables based on an assumption associated with a relationship between the hidden variables; and estimating the hidden variables based on the likelihood and the prior.

11. The method of claim 1, wherein the rotational motion of the joints comprises a rotational motion defined in a quaternion space.

12. A non-transitory computer-readable storage medium storing instructions that, when executed by a processor, cause the processor to perform the method of claim 1.

13. A motion processing apparatus comprising:
at least one processor configured to:
obtain a base-level motion by applying a linear Gaussian model to an input motion;
obtain a controllable motion displacement vector and a residual motion displacement vector by applying the linear Gaussian model to a displacement vector between the input motion and the base-level motion; and
synthesize an output motion based on the base-level motion and the controllable motion displacement vector, wherein the input motion comprises poses of a character corresponding to a first number of frames, the base-layer motion comprises poses of the character corresponding to a second number of frames, and a pose of the character comprises a vector related to a translational motion of a root defined corresponding to the character and a rotational motion of joints.

14. The motion processing apparatus of claim 13, wherein the processor is configured to synthesize the output motion by summing the base-level motion and the controllable motion displacement vector, the output motion comprising a motion obtained by removing the residual motion displacement vector from the input motion.

15. The motion processing apparatus of claim 13, wherein the processor is configured to:
assign a weight to the controllable motion displacement vector; and
synthesize the output motion by summing the base-level motion and the controllable motion displacement vector with the assigned weight.

16. The motion processing apparatus of claim 13, wherein to obtain the base-level motion, the processor is configured to:
map each of observation values of the input motion to each of hidden variables of the base-level motion;
define a linear relationship between the observation values and the hidden variables based on first noise following a Gaussian distribution and a result of the mapping;
obtain a likelihood that is a probability of the observation values being observed from the hidden variables based on the linear relationship;
obtain a prior of the hidden variables based on an assumption associated with a relationship between the hidden variables; and
estimate the hidden variables based on the likelihood and the prior, the observation values comprise information of poses of a character corresponding to a first number of frames, and the hidden variables comprise information of poses of the character corresponding to a second number of frames.

17. The motion processing apparatus of claim 16, wherein the processor is configured to map each of the observation values to each of the hidden variables at regular intervals based on a ratio between the first number and the second number.

18. The motion processing apparatus of claim 16, wherein the processor is configured to map each of the observation values to each of the hidden variables by dynamically controlling a mapping interval of the observation values and the hidden variables.

19. The motion processing apparatus of claim 13, wherein, to obtain the controllable motion displacement vector and the residual motion displacement vector, the processor is configured to:
obtain a likelihood that is a probability of observation values of the displacement vector between the input motion and the base-level motion being observed from hidden variables of the controllable motion displacement vector based on a linear relationship defined between the observation values and the hidden variables;
obtain a prior of the hidden variables based on an assumption associated with a relationship between the hidden variables; and
estimate the hidden variables based on the likelihood and the prior.

* * * * *